United States Patent
Gurin

(10) Patent No.: US 7,900,450 B2
(45) Date of Patent: Mar. 8, 2011

(54) THERMODYNAMIC POWER CONVERSION CYCLE AND METHODS OF USE

(75) Inventor: Michael H. Gurin, Glenview, IL (US)

(73) Assignee: Echogen Power Systems, Inc., Akron, OH (US)

(*) Notice: Subject to any disclaimer, the term of this patent is extended or adjusted under 35 U.S.C. 154(b) by 1020 days.

(21) Appl. No.: 11/612,417

(22) Filed: Dec. 18, 2006

(65) Prior Publication Data

US 2007/0151244 A1  Jul. 5, 2007

Related U.S. Application Data

(60) Provisional application No. 60/766,013, filed on Dec. 29, 2005.

(51) Int. Cl.
 *F03G 7/00* (2006.01)
(52) U.S. Cl. ............... 60/641.2; 60/641.6; 60/641.8
(58) Field of Classification Search ............ 60/641.2, 60/641.6, 641.8, 641.15
See application file for complete search history.

(56) References Cited

U.S. PATENT DOCUMENTS

| | | | | | |
|---|---|---|---|---|---|
| 4,336,692 A | * | 6/1982 | Ecker et al. | ....................... | 62/82 |
| 4,798,056 A | * | 1/1989 | Franklin | ...................... | 62/235.1 |
| 4,993,483 A | * | 2/1991 | Harris | .............................. | 165/45 |
| 5,738,164 A | * | 4/1998 | Hildebrand | .................... | 165/45 |
| 5,771,700 A | * | 6/1998 | Cochran | ........................ | 62/117 |
| 5,941,238 A | * | 8/1999 | Tracy | ............................ | 126/641 |
| 7,234,314 B1 | * | 6/2007 | Wiggs | ......................... | 62/235.1 |

* cited by examiner

*Primary Examiner* — Hoang M Nguyen
(74) *Attorney, Agent, or Firm* — Joseph J. Crimaldi; Roetzel & Amdress

(57) ABSTRACT

A high efficiency thermodynamic power conversion cycle is disclosed using thermal storage, atmospheric heat exchangers, and wind channeling in a synergistic method. Using the preferred configuration with ground source water, solar collectors, and heat pump including the further preferred utilization of ionic liquids or electrolyte solutions as the working fluid in the system, achieves optimal total energy efficiency and enables otherwise insufficient thermal differentials to effectively generate power.

14 Claims, 6 Drawing Sheets

Air Temperature > Geothermal Water Temperature Mode

Power Extraction Thermodynamic Cycle

Heat Pipe Circuit for Geothermal Energy HX

Storage of Heating or Cooling

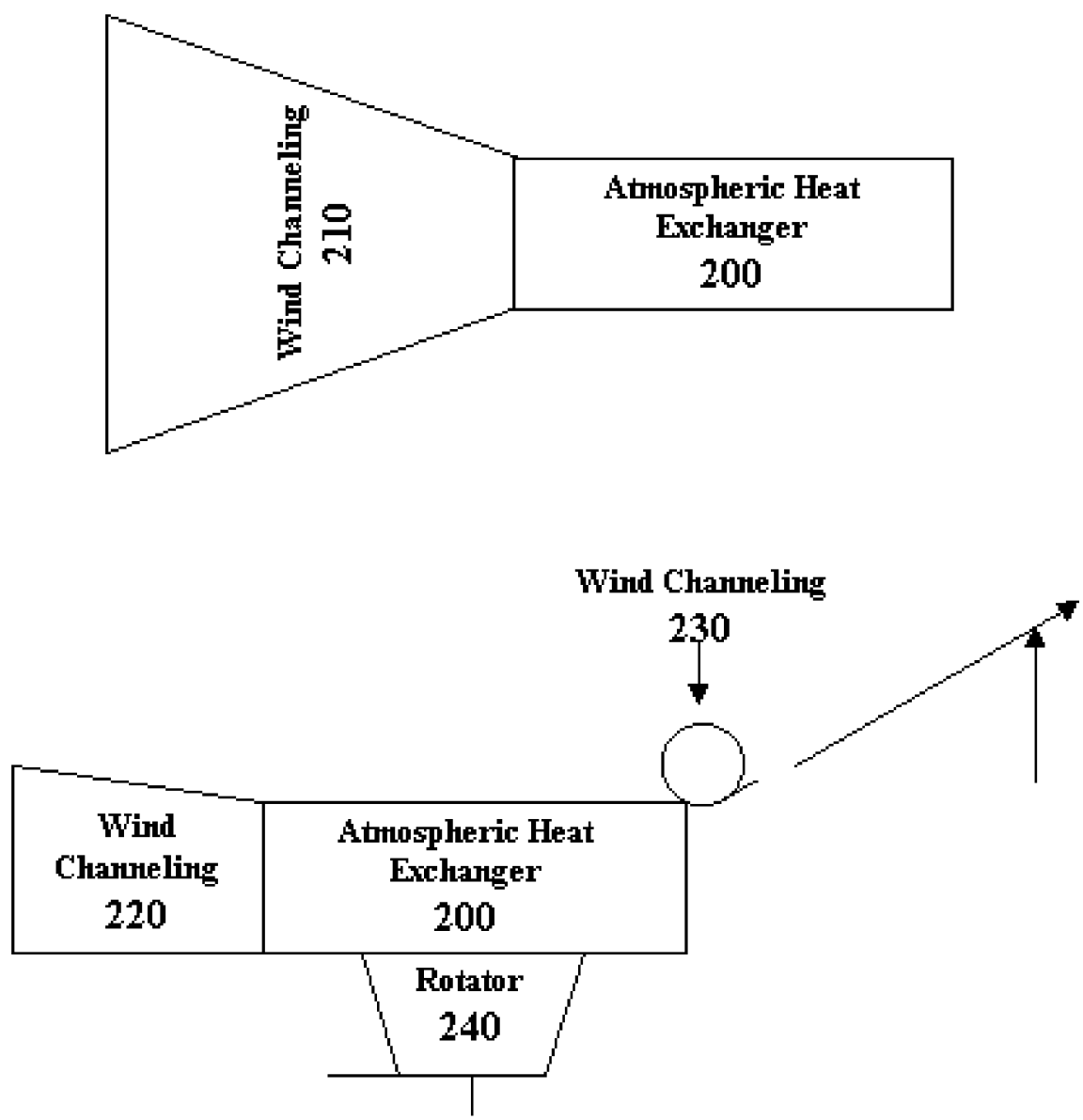

THERMODYNAMIC POWER CONVERSION CYCLE AND METHODS OF USE

CROSS-REFERENCE TO RELATED APPLICATIONS

This application claims priority from U.S. Provisional Patent Application Ser. No. 60/766,013 filed Dec. 29, 2005 and titled "Thermodynamic Power Conversion Cycle and Methods of Use" and is a continuation-in-part of U.S. Patent Application Ser. No. 60/595,167 filed Jun. 13, 2005, having the title "Nano-Ionic Liquids and Methods of Use" and included as reference only without priority claims and a continuation-in-part of U.S. Patent Application Ser. No. 60/593,485 filed Jan. 18, 2005, having the title "High Efficiency Absorption Heat Pump and Methods of Use" and included as reference only without priority claims.

FIELD OF THE INVENTION

The invention is directed generally to power generation cycles based on thermodynamic cycles, and more specifically to means and methods to increase the effective thermal differential between the heat source and sink, and means and methods to increase the pressure differential across the power extraction device.

DESCRIPTION OF RELATED ART

Geothermal heat pumps are well known in the art as a means of providing cooling or heating through thermal transport out/in respectively from ground source water. Geothermal thermodynamic power generation cycles are also well known in the art as a means of generating steam which in turn drives a power extraction device, such as a turbine. Both geothermal applications would benefit from means to increase the temperature differential between the heat source and sink.

U.S. Pat. No. 6,681,593 titled "Thermal energy storage system" by Gundlach discloses thermal energy storage system includes an ice-water shallow pool used for storing and extracting thermal energy cyclically, by thawing the ice and freezing water intra-seasonally. 593 fails to realize the cyclical utilization of intra-day and day-night temperature variations as a means to increase system efficiency on a semi-continuous basis.

U.S. Pat. No. 6,151,896 titled "Heating installation based on a stirling system" by Veringa, et al. discloses a heating installation with a Stirling engine and Stirling-type heat pump integrated within a single pressure vessel. Two hot chambers and two cold chambers, as well as a working chamber in which a piston is mounted such that it oscillates freely, are located inside the pressure vessel. The chambers are in fluid communication with one another. 896 fails to realize any gains from thermal storage or any means to increase the effective temperatures of the hot or cold chambers. 896 incorporates a hot water thermal storage system solely as a means to utilize the non-converted thermal energy into hot water rather than dissipating the non-converted thermal energy into the atmosphere.

Ambient Energy Systems Ltd. of the United Kingdom discloses the utilization of two thermal storage systems in conjunction with a traditional vapor compression heat pump as a means to utilize ambient (a.k.a. atmospheric) conditions to either gather solar energy or to dissipate thermal energy into the atmosphere, but fails too achieve power generating capabilities concurrently with either the sole production of cooling w/domestic hot water or heating. The Ambient system utilizes high surface area "atmospheric heat exchangers" that are fixed systems having low pressure traditional heat transfer working fluids, thus requiring an excessive amount of pump energy to overcome fluid friction losses. Furthermore, Ambient is limited to one thermodynamic cycle that is the standard heat pump cycle. A less sophisticated system has also been developed by Kajima Corporation, which utilizes a single thermal storage and ambient heat exchangers, as a means again to increase the traditional heat pump thermodynamic cycle. Neither system anticipates, nor is capable, of generating power while concurrently realizing the additional gains of increased system coefficient of performance.

There are no additional patent or literature references that disclose the use of thermal storage as a means of increasing the temperature differential, nor the utilization of atmospheric heat exchangers either with or without wind channeling devices, nor the utilization of novel working fluids including ionic liquids or electride/alkalide solutions as a means to increase pressure differential to temperature differential ratio.

The art lacks a high efficiency cost effective means to convert thermal energy into mechanical/electrical power for small (approximately 15 degrees Kelvin) temperature differentials or the means to efficiently increase the temperature differential.

SUMMARY OF THE INVENTION

The present invention is a modified thermodynamic cycle that achieves superior energy conversion efficiency by maximizing the temperature and pressure differentials between the heat source and sink. A fundamental benefit resulting from the inventive design is a significant reduction in thermal losses and the ability to extract power at relatively low temperature differentials.

DESCRIPTION OF DRAWINGS

FIG. 1B—A block diagram view depicting fluid communication lines for conditions where air temperature is less than geothermal water temperature.

FIG. 7—A cross-sectional view of the integral wind channeling capabilities on the atmospheric heat exchanger.

Figure 1A:
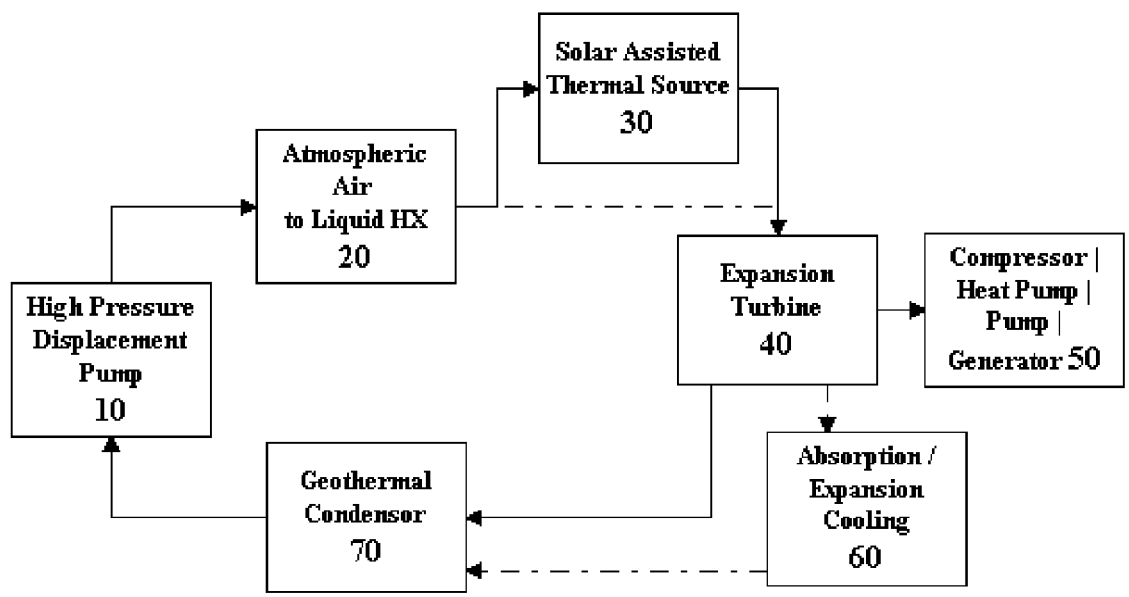
FIG. 1A—A block diagram view depicting fluid communication lines for conditions where air temperature is greater than geothermal water temperature.

The term "rotator motor" is defined as an external means to rotate a component attached to said rotator motor.

The term "thermal bus" is defined as a means for transporting thermal energy in a directed manner from one location to another location.

The term "atmospheric" is defined as produced by, dependent on, or coming from the atmosphere.

The term "wind channeling" is defined as means to direct or guide wind along some desired course, preferably having a concentrated or amplified impact and higher velocity.

The term "heat driven pulse pump" is defined as a means to generate pumping action by exploiting periodic (pulsed) heating and vaporization alternating with cooling and condensation of the fluid to be pumped.

The term "thermodynamic cycle" is defined as a process in which a working fluid undergoes a series of state changes and finally returns to its initial state.

The term "solar energy" is defined as energy derived from the sun, which most often refers to the direct conversion of radiated photons into electrons or phonons through a wide range of means. Solar energy is also indirectly converted into additional energy forms such as the heating of ground water (a.k.a. geothermal water).

The term "geothermal" is defined as of or relating to the internal heat of the earth, which is impacted by absorbed solar energy.

The term "ionic liquids" is defined as liquids that are highly solvating, non-coordinating medium in which a variety of organic and inorganic solutes are able to dissolve. They are outstanding good solvents for a variety of compounds, and their lack of a measurable vapour pressure makes them a desirable substitute for VOCs. Ionic liquids are attractive solvents as they are non-volatile, non-flammable, have a high thermal stability and are relatively inexpensive to manufacture. The key point about ionic liquids is that they are liquid salts, which means they consist of a salt that exists in the liquid phase and have to be manufactured, they are not simply salts dissolved in liquid. Usually one or both of the ions is particularly large and the cation has a low degree of symmetry results, these factors result in ionic liquids having a reduced lattice energy and hence lower melting points.

The term "electride" is defined as being just like alkalides except that the anion is presumed to be simply a electron which is localized to a region of the crystal between the complexed cations.

The term "alkalide" is defined as a class of ionic compounds where the Anions are of the Type I group (Alkali) elements Na, K, Rb, Cs (no known 'Lithide' exists). The cation is a alkali cation complexed by a large organic complexant. The resulting chemical form is A+[Complexant]B−, where the complexant is either a Cryptand, Crown Ether, or Aza-Crown.

The term "nanofluid" is defined as a fluid that contains nanoscale powders, which are powders having a diameter of less than 1 micron and preferably less than 100 nanometers.

The term "supercritical" is defined as the point at which fluids have been exploited above their critical temperatures and pressures The term "heat pump" is defined as a the transport of thermal energy extracted from a heat source to a heat sink by means including vapor compression, absorption, and adsorption.

It is an object of the invention to increase the temperature differential between a heat source and sink.

Another object of the invention is to integrate an absorption heat pump with integral power extraction capabilities to a standard vapor compression heat pump as a means of increasing total power conversion and cooling coefficient of performance.

A further object of the invention is to utilize day to night temperature differentials as a means to increase the temperature differential between a heat source and sink.

A yet further object of the invention is to utilize solar energy collected by either solar collector or concentrator as a means to increase the temperature differential between a heat source and sink.

Another object of the invention is to utilize a dynamically switchable thermal bus as a means to reconfigure heat transport between fluid communication lines.

Yet another object of the invention is to extract thermal energy from the atmosphere during the relatively hot day time as a means of increasing the heat source temperature and during the relatively cool night time as a means of decreasing the heat sink temperature both utilizing thermal storage capabilities.

A further object of the invention is to reduce auxiliary support equipment power consumption by decreasing pump and fan energy, including the means of utilizing heat driven pulse pump configurations, heat pipes, and the like, and utilizing wind channeling through an atmospheric heat exchanger respectively.

The figures depicted within the specification of the invention provides exemplary configurations of the most critical components of the power conversion system. A detailed description of the figures is provided in the following paragraphs.

DETAILED DESCRIPTION OF THE PREFERRED EMBODIMENTS

A thermodynamic power conversion device according to an embodiment of the present invention will be explained below with reference to the drawings.

Figure 1B:
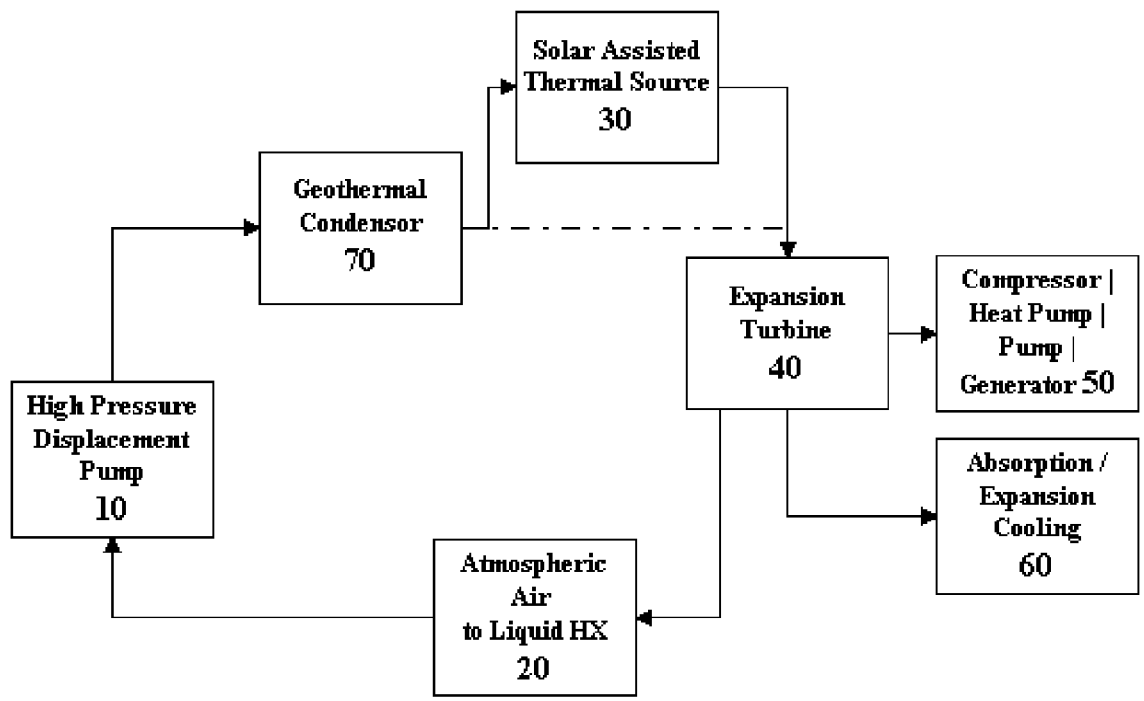

FIGS. 1A and 1B, which is a block diagram of the fluid communication lines between the power conversion device's major components, depicts numerous inventive features. The thermodynamic power conversion device is a hybrid geothermal thermodynamic cycle, though significantly lower ground source operating temperatures are anticipated in addition to the traditional operating temperatures, coupled with at least one further thermodynamic cycle selected from the group consisting of absorption, adsorption, and vapor compression heat pump.

FIG. 1A specifically depicts the thermodynamic power conversion device, hereinafter referred to as "TPC", shows the configuration when the ambient/atmospheric air temperature is greater than the ground source/geothermal water temperature. The ground source water thermal energy is transported into the thermodynamic cycle through the geothermal condenser (FIG. 1A—70) which is more accurately serving as an evaporator. The working fluid is in fluid communication with the high pressure displacement pump (FIG. 1A—10), which can alternatively be a heat driven pulse pump, a gerotor, or additional means of achieving high efficiency pumping. The working fluid is further in fluid communication optionally with the atmospheric air to liquid heat exchanger "HX" (FIG. 1A—20) as a first stage means to increase the working fluid temperature. An optional, though preferred, second stage means to further increase working fluid temperatures is realized by solar assisted thermal source (FIG. 1A—30). Such solar assisted thermal sources include solar thermal collectors (i.e., flat panel, evacuated tubes). A further third stage is preferably a solar concentrator. The configuration of the three subsequent heating stages minimizes capital costs and thermal losses. Additional thermal sources, which would be integrated at any point at which the working fluid is less than the temperature of the thermal source though preferably at the highest temperature less than the thermal source, are integrated into the inventive TPC. These include waste heat sources, combustion from fuel sources including low quality biomass sources. The working fluid, which is now at the highest temperature and pressure within the thermodynamic cycle. The working fluid is in direct fluid communication with a pressure expander such as the detailed expansion turbine (FIG. 1A—40). The pressure expander can alternatively drive a compressor, heat pump, or electrical generator (FIG. 1A—50). A byproduct of the expansion process is cooling capabilities, especially realized by the optional absorption/expansion cooling device (FIG. 1A—60). Additional components such as desuperheaters, precoolers/subcoolers are anticipated as means to increase pressure differentials and/or cooling capacities. These additional components are especially noted when the working fluid is a supercritical fluid.

FIG. 1B depicts the TPC when the ambient air temperature is less than the ground source water temperature. The main difference being the placement within the fluid communication line of the geothermal condenser (FIG. 1B—70) serving as the first stage of heating of the working fluid. The atmospheric heat exchanger (FIG. 1B—20) now serves as an evaporator in order to reduce the working fluid temperature, thus being a heat sink.

Figure 2:
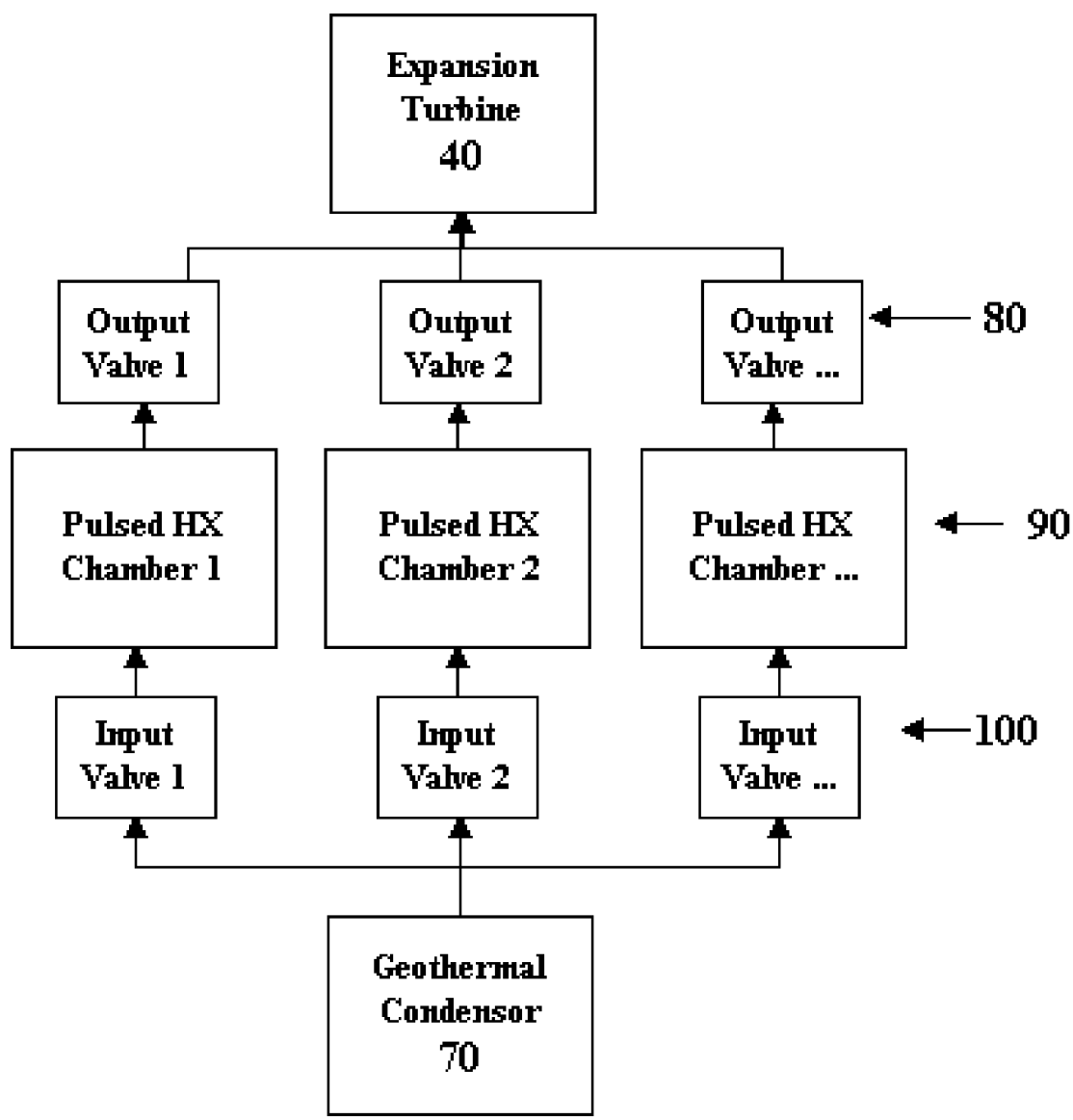
FIG. 2—A block diagram view depicting fluid communication lines for pulsed pump.

FIG. 2 depicts the broad concept of a heat driven pulse pump within the TPC. Specifically a series of parallel sequenced input valves (FIG. 2—100) obtains the working fluid as an output from the geothermal condenser (FIG. 2—70) at virtually any point prior to the expansion turbine (FIG. 2—40). The input valves are in fluid communication with pulsed HX chamber (FIG. 2—90) at which the working fluid is heated as a means of increasing the working fluid pressure. The resulting heated working fluid creates a pumping action by utilizing the pressure differential to displace lower pressure working fluid, which is controlled by a series of parallel output valves (FIG. 2—80).

Figure 3:
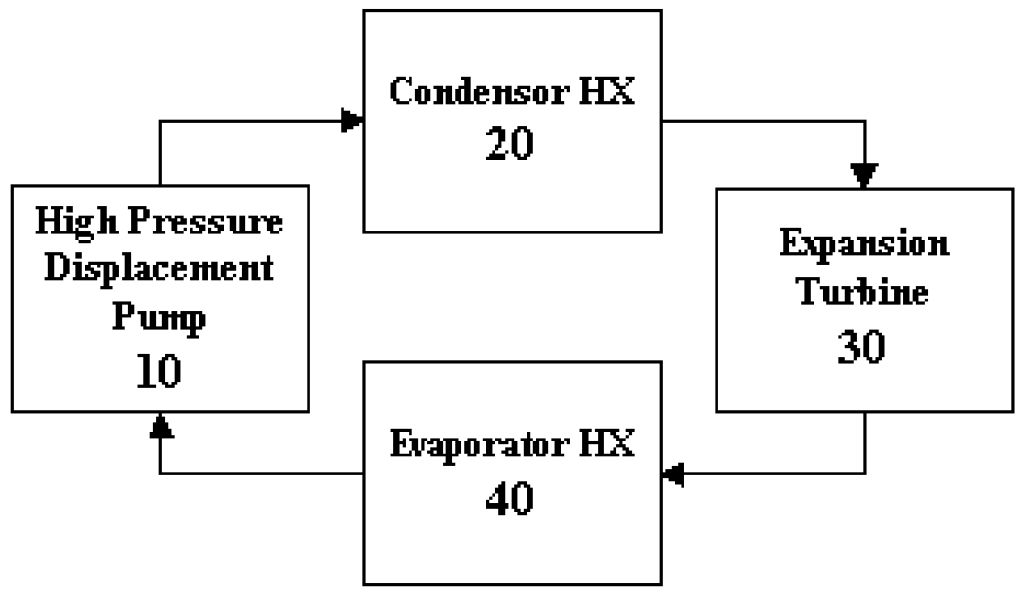
FIG. 3—A block diagram view depicting fluid communication lines for standard power extraction through thermodynamic cycle.

FIG. 3 depicts a simplified thermodynamic cycle representation in which the working fluid utilizes a pressure differential realized by a temperature differential to drive an expansion turbine (FIG. 3—30). The working fluid is then in fluid communication with a heat sink represented by the evaporator HX (FIG. 3—40) which is optimally also the secondary heat pump condenser though acting as evaporator within the thermodynamic cycle. A displacement pump, preferably a high pressure displacement pump (FIG. 3—10) controls the flow of the working fluid such that the working fluid is displaced into the heat source represented by the condenser HX (FIG. 3—20) again also optimally is the secondary heat pump evaporator though acting as condenser within the thermodynamic cycle.

Figure 4:
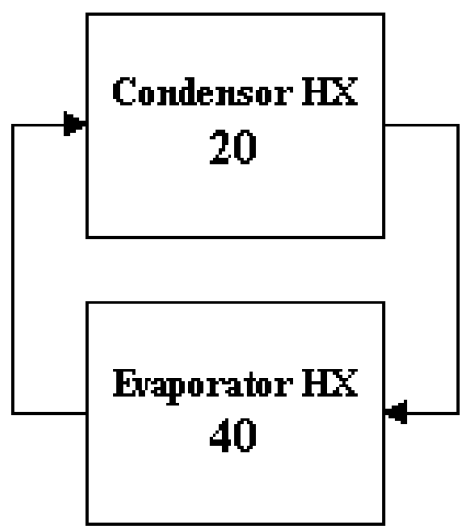
FIG. 4—A block diagram view depicting fluid communication lines for thermal transport utilizing a heat pipe between evaporator and condenser.

FIG. 4 depicts a simplified heat pipe circuit, which is also anticipated to be any means of transporting thermal energy over relatively significant distances at minimal pressure losses. Such thermal transport essentially takes place between any heat source, represented by (FIG. 4—20) as condenser HX, and any heat sink, represented by (FIG. 4—40) as evaporator HX.

Figure 5:
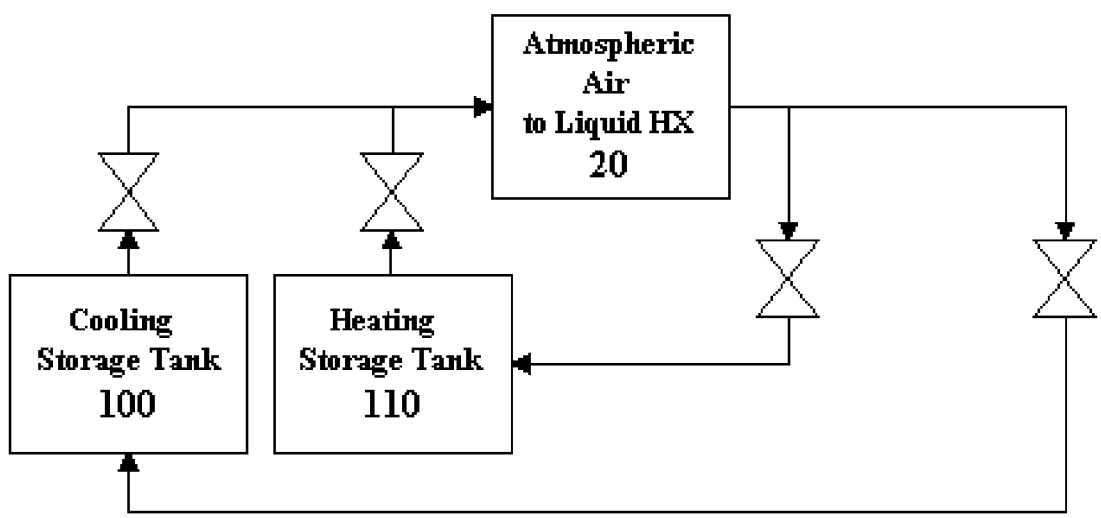
FIG. 5—A block diagram view depicting fluid communication lines for thermal transport between either of two thermal storage tanks.

FIG. 5 depicts a simplified circuit for which the atmospheric heat exchanger (FIG. 5—20) is controllable to be in fluid communication with either a relatively cooler thermal storage tank (FIG. 5—100) and a relatively warmer thermal storage (FIG. 5—110).

Figure 6:
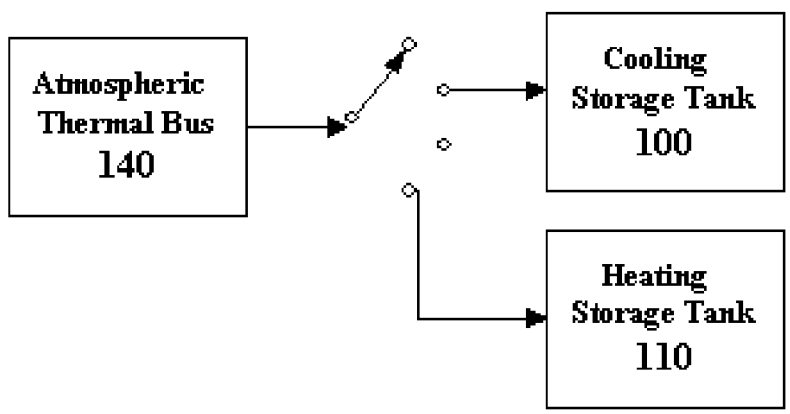
FIG. 6—A block diagram view depicting thermal transport through thermal bus with switching capability between either of two thermal storage tanks.

FIG. 6 depicts a simplified thermal bus circuit that utilizes the high thermal conductivity and low thermal resistance means of a thermal bus as effective means to transport thermal energy between virtually any heat source and sink. The thermal bus (FIG. 6—140) is switchable between virtually any two components shown here as being represented by a relatively cooler thermal storage tank (FIG. 6—100) and relatively warmer thermal storage tank (FIG. 6—110). The switch means includes thermal diodes or additional methods known in the art of controlling thermal transport between desired states of high thermal conductivity with low thermal resistance, and low thermal conductivity with high thermal resistance.

FIG. 7 depicts the integration of wind channeling into the atmospheric heat exchanger. The atmospheric heat exchanger (FIG. 7—200) has its airflow being directed into the heat exchanger at an accelerated velocity, as a means of reducing fan power and increasing heat transfer. The airflow is guided by a series of wind channeling devices (FIG. 7—210) as known in the art, preferably aerodynamically optimized to minimize skin friction losses. The depiction is accurate as both/either cross section view or top view respectively. A preferred orientation is the utilization of solar collector (FIG. 7—220) that are dynamically repositioned to serve the secondary function of wind channeling upon exemplary structures such as a roof structure. Alternatively, the wind channeling device as exemplified by (FIG. 7—230) is depicted by a solar collector that is a flexible substrate which is capable of being rolled. The preferred solar collector is further capable of being raised and extended to meet the specific optimization requirements ranging from maximizing solar collection, maximizing wind power conversion, minimizing susceptibility to wind damage during periods of excess winds. Finally, the means to maximize air flow is realized by the entire atmospheric heat exchanger (FIG. 7—200) being rotated by methods known in the art for motion control is achieved by the exemplary rotary motor (FIG. 7—240).

Numerous additional features of the inventive power conversion device are detailed as follows.

The thermodynamic power conversion device is dynamically switch-able between at least a two operating modes wherein the first mode is the heat sink is a geothermal source when the temperature of said geothermal source is lower than either the ambient or thermal storage temperature or the second mode is the heat source is a geothermal source when the temperature of said geothermal source is higher than either ambient or thermal storage temperature. The preferred thermal storage device is comprised of at least two thermal storage tanks having a temperature differential between the storage tanks of at least 15 degrees Kelvin.

The auxiliary/ancillary energy requirements are minimized by the further inclusion of at least one from the group consisting of a heat driven pulse pump, heat pipe, loop heat pipe, capillary heat pipe, thermal bus, and heat pump.

The more preferred thermal storage tank has an increasing/higher temperature by preheating the heat source working fluid during the day time via heat transfer in an atmospheric heat exchanger. The specifically preferred thermal storage tank has an increasing/higher temperature by infusing solar energy from a solar energy collection device.

The infused solar energy increases the heat source temperature in real-time by a solar collector as a means to increase power conversion efficiency. It is further anticipated that a first stage solar collector is comprised of traditional flat panel solar collectors and evacuated solar thermal tubes. It is further anticipated that a second stage solar collector is comprised of concentrated solar energy. The second stage resulting from solar concentrator enables a higher heat source with minimal thermal losses and maximum power efficiency. The output of the solar collector is in fluid communication with the device having higher temperatures selected from geothermal or thermal storage working fluids. It is further anticipated that waste heat from processes in close proximity can be in indirect fluid communications, such that the waste process heat is infused at the highest thermodynamic cycle temperature without exceeding the actual waste process heat temperature.

The atmospheric heat exchanger is in either direct or indirect fluid communication, or via thermal bus as a means of transporting thermal energy into the higher temperature device selected from geothermal or thermal storage working fluids when the atmospheric heat exchanger temperature is greater than either of geothermal or thermal storage working fluids. Alternatively, the atmospheric heat exchanger is in fluid communication with the device of lower temperature selected from geothermal or thermal storage working fluids when the atmospheric heat exchanger temperature is lower than either of geothermal or thermal storage working fluids.

A preferred atmospheric heat exchanger is further comprised of at least one device selected from the group consisting of wind channeling device as a means of enhancing heat transfer, a rotator motor as a means of maximizing air flow, and solar shielding device as a means of controlling solar thermal gain. The wind channeling device, which includes devices such as Aeolian Roof or other known methods in the art for wind concentration, wind amplification, and wind channeling. The principle purpose, independent of method is to increase the wind velocity. The more preferred atmospheric heat exchanger with an integral wind channeling device is further comprised of a wind power converter, such as a wind turbine. The specifically preferred wind power converter is mounted horizontally so that the wind channeling does not interfere with solar collectors/concentrators.

A particularly preferred atmospheric heat exchanger is capable of dynamically switching between evaporator or condenser modes. One such operating mode is day time operation where the atmospheric heat exchanger extracts thermal energy from the atmosphere. Another such operating mode is night time operation where the atmospheric heat exchanger radiates thermal energy. The optimal switching mode reflects a series of parameters including real-time conditions such as weather (e.g., temperature), wind speed, humidity, etc. The ability to incorporate historic host operating conditions, such as obtainable from energy management systems, and projected weather forecast enables the system to schedule its operational modes between heat sink or source. An operating mode of the invention is the incorporation of a multivariate control system that integrates operational history with weather forecasts to determine a dynamic configuration that includes scheduling of times at which atmospheric heat exchanger operates as a heat sink or source and whereby the heat transport is dynamically altered to sink or source to/from thermal storage tanks, solar collectors, solar concentrators, geothermal ground water source, heat pump evaporator or condenser. A significant energy source is collected directly from solar energy via solar collectors/concentrators. The gathering of solar energy is largely influenced by numerous weather parameters that include cloud cover, seasonality, daily variation between minimum and maximum temperatures (i.e., day and night temperatures). Given that the coefficient of performance is largely dictated by maximizing the temperature differential, it is optimal for the system to operate at times at which the maximum temperature differential is realized. However, the demand for power, heating/cooling, and domestic hot water is asynchronous with the supply of power, heating/cooling, and domestic hot water. Thus, the determination in real-time to configure/reconfigure the transport of thermal energy is constantly changing between meeting the real-time demand of the resource in highest demand or having the highest economic cost, or alternatively optimizing for total operating cost over a fixed period of time (e.g., daily, weekly, monthly).

The complexity of the control scheme is best achieved by the combination of a distributed control system having a direct real-time communication link to network resources that determine and shift optimal configuration schemes based on historic and forecasted operating data in combination with historic and forecasted weather data.

The particularly preferred atmospheric heat exchanger is a multifunctional device integrating functions selected from the group consisting of structural support, architectural design element, or barrier wall. The atmospheric heat exchanger, especially large surface area systems, have the means for example to leverage a common structural support with solar collectors/concentrators. A large surface area solar collector also serves inherently as an inherent thermal bus, i.e., metal structures have great thermal mass and low thermal resistance. Furthermore, a large heat exchanger (specifically an air heat exchanger) requires large amounts of air flow. Large amounts of air flow are also required by wind power converter systems (e.g., wind turbines). Thus the preferred configuration is such that heat exchanger, which is ultimately a supercritical thin film microchannel heat exchanger, guides/directs the airflow serving as a wind channeling device (a.k.a. ducted wind turbines, wind amplifiers, wind concentrators).

It is known in the art, that electrostatic fields have the ability to enhance heat transfer, thus the large surface area atmospheric heat exchanger will greatly benefit from such enhancement. Another means of improving thermal diffusion is through the utilization of evaporative cooling, which includes methods known in the art of increasing evaporation rates (e.g., SwirlFlash™, atomization means, electrostatic "explosive" forces). An additional benefit of a change in temperature of the air flow includes the ability to leverage the "chimney effect", which is the tendency of heated air or gas to rise in a duct or other vertical passage, such as in a chimney, small enclosure, or building, due to its lower density compared to the surrounding air or gas. Thus the atmospheric heat exchanger will actually increase airflow, thus power generated by wind power converter, during times in which the atmospheric heat exchanger is operating as a condenser when the heat exchanger is situated following the wind power converter device. It is further anticipated that the means to rotate the atmospheric heat exchanger, or the wind channeling device through such means as known in the art, and herein referred to as a rotator motor, enables the maximum amount of airflow to pass through the atmospheric heat exchanger and the wind power converter. This serves the multifunctional purpose of maximizing heat transfer and power generation. A further advantage of the wind channeling is the reduction in auxiliary fan power consumption, which is an integral component to most air heat exchangers.

Alternatively, wind channeling is achieved by the secondary function of the solar collector. Optimal solar energy production is achieved by utilizing solar tracking capabilities. Utilizing the same tracking capabilities enables the solar collectors/concentrators to be reconfigured, especially during reduced solar producing times, for optimal combined total net energy production and consumption. An important design consideration for solar collectors/concentrators is their ability to survive high wind conditions, thus the tracking means also provides the additional capability of minimizing air forces on the solar collector beyond the engineered limits. In other words, at wind speeds in excess of a predetermined limit, the solar collector positioning is reconfigured to keep within atmospheric heat exchanger and solar collector airflow limits.

During times at which the atmospheric heat exchanger is operating in the evaporator mode, the wind channeling device may serve the secondary function of providing solar shielding. It is recognized within the art that solar gains decrease the operating effectiveness of exterior mounted evaporators.

The further inclusion of a heat pump introduces at least a second thermodynamic cycle, which increases the overall desired outputs including power, domestic hot water, and cooling/heating capabilities. The heat pump provides a synergistic effect throughout the system. Numerous configurations are realized by the inventive thermodynamic power converter system. Such configurations include the heat pump condenser in indirect fluid communication with at least one selected from the group consisting of a solar collector when operating in cooling mode and solar collector inlet temperature is less than condenser temperature, solar collector when operating in cooling mode and solar collector outlet temperature is less than condenser temperature, a high temperature thermal storage device wherein high temperature is at least 15 degrees Kelvin greater than a low temperature thermal storage device when operating in cooling mode and condenser temperature is greater than high temperature thermal storage device, power conversion device when operating in cooling mode and the high pressure side power conversion device wherein high pressure side power conversion device has a pressure greater than low pressure side power conversion device and high pressure side power conversion device temperature less than condenser temperature, power conversion device when operating in cooling mode and the low pressure side power conversion device wherein low pressure side power conversion device has a pressure lesser than high pressure side power conversion device and low pressure side power conversion device temperature less than condenser temperature, a solar collector when operating in heating mode and solar collector inlet temperature is less than evaporator temperature, solar collector when operating in heating mode and solar collector outlet temperature is less than evaporator temperature, a low temperature thermal storage device wherein low temperature is at least 15 degrees Kelvin less than a high temperature thermal storage device when operating in heating mode and evaporator temperature is less than low temperature thermal storage device, power conversion device when operating in heating mode and the low pressure side power conversion device wherein low pressure side power conversion device has a pressure lesser than high pressure side power conversion device and low pressure side power conversion device temperature higher than evaporator temperature, or power conversion device when operating in heating mode and the high pressure side power conversion device wherein high pressure side power conversion device has a pressure greater than low pressure side power conversion device and high pressure side power conversion device temperature greater than evaporator temperature.

The integration of the thermodynamic power converter cycle and heat pump enables the noted low temperature differentials of 15 degrees Kelvin to achieve power generation and increased coefficient of performance. One of the most important design considerations for effective power generation is the ratio between temperature differentials and pressure differentials. An important feature of the inventive power converter cycle is the further inclusion of superior heat transfer fluids. Most noted are the inclusion of binary working fluids selected from at least one from the group of ionic liquid, poly(ionic liquid) polymer, electreide, alkalide, and nanofluid solutions. The preferred working fluids further include supercritical gases, with the more preferred supercritical gas being carbon dioxide. The particularly preferred working fluids are selected from the group consisting of ionic liquids, combination of ionic liquids and poly(ionic liquid) polymers. The specifically preferred working fluid is comprised of a heat transfer fluid comprised of at least one ionic liquid and at least one poly(ionic liquid) polymer.

A specifically preferred system configuration is an enhanced geothermal system, thus a ground water source is utilized in a dynamic switchable mode between heat source and sink. A method for operating the geothermal system is comprising: (A) power conversion device; (B) thermal storage system; (C) monitoring at least the inlet temperatures of the thermal storage system and geothermal system.

The combined ability to generate power at relatively low temperature differentials is a significant motivator for the ability to store available energy, especially freely available energy (e.g., waste heat, solar energy, atmospheric cooling including radiating energy to the sky). Given the various outputs of the combined system (e.g., power, cooling/heating, domestic hot water) and the wide range of integral components for further transporting thermal energy (e.g., solar collectors, ground source water, etc.) leads to an increasing demand for the relatively low cost thermal storage tanks. The optimal thermal storage system is comprised of at least one low temperature thermal storage device and at least one thermal storage device wherein the temperature differential between said low and high temperature is a minimum of 15 degrees Kelvin.

Both the geothermal system and the thermodynamic power converter cycle realize additional gains in net power production and coefficients of performance by incorporating further devices selected from at least one from the group consisting of a heat driven pulse pump, heat pipe, loop heat pipe, or capillary heat pipe, thermal bus, and heat pump. Additional means to reduce pumping and fan energy are instrumental in increasing overall system effectiveness. A continuous optimization scheme is implemented by dynamically reconfiguring system configuration as a means to optimize the aggregate of atmospheric heat exchanger energy consumption and ancillary power generation. This includes configuration of the geothermal system to operate as a heat sink when temperature of geothermal source is lower than either ambient or thermal storage temperature or heat source when temperature of geothermal source is higher than either ambient or thermal storage temperature.

The inventive system is further anticipated to include additional ancillary power generation equipment achieved by the direct integration of at least one device selected from the group consisting of wind turbines, solar collectors, and thermodynamic cycle pressure expanders. The incorporation of wind turbines enables the overall system to generate at least part of the ancillary power requirements including the power for control systems, pumps, and fans. The further inclusion of thermodynamic cycle pressure expanders, which include devices known in the art (e.g., gerotor, Ramgen™, Quasiturbine™) all enable superior energy efficiencies to be realized.

Additional features and advantages of the present invention are described in and will be apparent from the detailed description of the presently preferred embodiments. It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A thermodynamic power conversion device comprising:
at least one first configuration designed to operate when an ambient, or atmospheric, temperature is greater than the ground source, or geothermal water, temperature and at least one first configuration designed to operate when an ambient, or atmospheric, temperature is less than the ground source, or geothermal water, temperature, where both configurations comprise:
   at least one working fluid;
   at least one reversible pump designed to utilize the at least one working fluid wherein the at least one reversible pump and the working fluid therein are in fluid communication with either at least one external atmospheric interface or at least one liquid-based heat exchanger, wherein the combination of the at least one reversible pump, the at least one working fluid and the contact with either the least one external atmospheric interface or the at least one liquid-based heat exchanger results in an increase in the temperature of the at least one working fluid;
   at least one expansion device that is operatively coupled via fluid communication to the at least one reversible pump via either the at least one external atmospheric interface or the at least one liquid-based heat exchanger, wherein the at least one expansion device is able to accomplish work as a result of the expansion of the at least one working fluid, whereby as a result of the work generated by the expansion of the at least one working fluid, the at least one expansion device causes the at least one working fluid to undergo a temperature drop; and
   at least one geothermal condenser that is operatively coupled by fluid communication to both the at least one reversible pump and the at least one expansion device, wherein the at least one geothermal condenser is designed to enable the transport of energy, or heat, to the at least one working fluid,
wherein when the ambient, or atmospheric, temperature is greater than the ground source, or geothermal water, temperature the at least one working fluid of the thermodynamic power conversion device flows in a direction from the at least one reversible pump to the at least one external atmospheric interface or at least one liquid-based heat exchanger to the at least one expansion device to the at least one geothermal condenser and then back to the at least one reversible pump, and
wherein when the ambient, or atmospheric, temperature is less than the ground source, or geothermal water, temperature the at least one working fluid of the thermodynamic power conversion device flows in a direction from the at least one reversible pump to the at least one geothermal condenser to the at least one expansion device to the at least one external atmospheric interface or at least one liquid-based heat exchanger and then back to the at least one reversible pump.

2. The thermodynamic power conversion device of claim 1, further comprising at least one solar assisted thermal source is operatively coupled via the at least one working fluid and is located between the at least one at least one external atmospheric interface or at least one liquid-based heat exchanger and the at least one expansion device.

3. The thermodynamic power conversion device of claim 1, further comprising at least one solar assisted thermal source is operatively coupled via the at least one working fluid and is located between the at least one geothermal condenser and the at least one expansion device.

4. The thermodynamic power conversion device of claim 1, further comprising at least one solar assisted thermal source is operatively coupled via the at least one working fluid and is located between the at least one at least one external atmospheric interface or at least one liquid-based heat exchanger and the at least one expansion device; and at least one solar assisted thermal source is operatively coupled via the at least one working fluid and is located between the at least one geothermal condenser and the at least one expansion device.

5. The thermodynamic power conversion device of claim 1, wherein the at least one expansion device is operatively coupled to at least one compressor, heat pump, pump, generator, or a combination of two or more thereof, and wherein the at least one expansion device transmits the work generated to any of the one or more devices to which the at least one expansion device is operatively coupled to.

6. The thermodynamic power conversion device of claim 1, further comprising at least one absorption- and/or expansion-based cooling device that is operatively coupled to the at least one expansion device.

7. The thermodynamic power conversion device of claim 1, wherein the at least one pump is selected from at least one heat driven pulse pump, heat pump, a gerotor, a high efficiency pump, or any combination of two of more thereof.

8. A method for operating a geothermal system, the method comprising the steps of:
(A) supplying at least one thermodynamic power conversion device, the thermodynamic power conversion device comprising:
   at least one first configuration designed to operate when an ambient, or atmospheric, temperature is greater than the ground source, or geothermal water, temperature and at least one first configuration designed to operate when an ambient, or atmospheric, temperature is less than the ground source, or geothermal water, temperature, where both configurations comprise:
      at least one working fluid;
      at least one reversible pump designed to utilize the at least one working fluid wherein the at least one reversible pump and the working fluid therein are in fluid communication with either at least one external atmospheric interface or at least one liquid-based heat exchanger, wherein the combination of the at least one reversible pump, the at least one working fluid and the contact with either the least one external atmospheric interface or the at least one liquid-based heat exchanger results in an increase in the temperature of the at least one working fluid;
      at least one expansion device that is operatively coupled via fluid communication to the at least one reversible pump via either the at least one external atmospheric interface or the at least one liquid-based heat exchanger, wherein the at least one expansion device is able to accomplish work as a result of the expansion of the at least one working fluid, whereby as a result of the work generated by the expansion of the at least one working fluid, the at least one expansion device causes the at least one working fluid to undergo a temperature drop; and
      at least one geothermal condenser that is operatively coupled by fluid communication to both the at least one reversible pump and the at least one expansion device, wherein the at least one geothermal condenser is designed to enable the transport of energy, or heat, to the at least one working fluid, wherein when the ambient, or atmospheric, temperature is greater than the ground source, or geothermal water, temperature the at least one working fluid of the thermodynamic power conversion device flows in a direction from the at least one reversible pump to the at least one external atmospheric interface or at least one liquid-based heat exchanger to the at least one expansion device to the at least one geothermal condenser and then back to the at least one reversible pump, and wherein when the ambient, or atmospheric, temperature is less than the ground source, or geothermal water, temperature the at least one working fluid of the thermodynamic power conversion device flows in a direction from the at least one reversible pump to the at least one geothermal condenser to the at least one expansion device to the at least one external atmospheric interface or at least one liquid-based heat exchanger and then back to the at least one reversible pump; and (B) utilizing the at least one thermodynamic power conversion device to increase the average temperature differential between at least one heat source and at least one heat sink, so as to result in an increase in the energy efficiency of a geothermal system.

9. The method of claim 8, wherein the at least one thermodynamic power conversion device further comprises at least one solar assisted thermal source is operatively coupled via the at least one working fluid and is located between the at least one at least one external atmospheric interface or at least one liquid-based heat exchanger and the at least one expansion device.

10. The method of claim 8, wherein the at least one thermodynamic power conversion device further comprises at least one solar assisted thermal source is operatively coupled via the at least one working fluid and is located between the at least one geothermal condenser and the at least one expansion device.

11. The method of claim 8, wherein the at least one thermodynamic power conversion device further comprises at least one solar assisted thermal source is operatively coupled via the at least one working fluid and is located between the at least one at least one external atmospheric interface or at least one liquid-based heat exchanger and the at least one expansion device; and at least one solar assisted thermal source is operatively coupled via the at least one working fluid and is located between the at least one geothermal condenser and the at least one expansion device.

12. The method of claim 8, wherein the at least one expansion device is operatively coupled to at least one compressor, heat pump, pump, generator, or a combination of two or more thereof, and wherein the at least one expansion device transmits the work generated to any of the one or more devices to which the at least one expansion device is operatively coupled to.

13. The method of claim 8, wherein the at least one thermodynamic power conversion device further comprises at least one absorption- and/or expansion-based cooling device that is operatively coupled to the at least one expansion device.

14. The method of claim 8, wherein the at least one pump is selected from at least one heat driven pulse pump, heat pump, a gerotor, a high efficiency pump, or any combination of two of more thereof.

* * * * *